United States Patent
Fan

(10) Patent No.: US 11,797,537 B2
(45) Date of Patent: Oct. 24, 2023

(54) DATA PROCESSING METHOD, DATA PROCESSING DEVICE AND NON-VOLATILE COMPUTER-READABLE STORAGE MEDIA

(71) Applicant: BOE Technology Group Co., Ltd., Beijing (CN)

(72) Inventor: Panwei Fan, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 82 days.

(21) Appl. No.: 17/521,356

(22) Filed: Nov. 8, 2021

(65) Prior Publication Data

US 2022/0164344 A1  May 26, 2022

(30) Foreign Application Priority Data

Nov. 24, 2020  (CN) .......................... 202011332603.3

(51) Int. Cl.
  *G06F 16/2455* (2019.01)
  *G06F 16/242* (2019.01)

(52) U.S. Cl.
  CPC ...... *G06F 16/2455* (2019.01); *G06F 16/2433* (2019.01)

(58) Field of Classification Search
  CPC .......................... G06F 16/2455; G06F 16/2433
  USPC ....................................................... 707/771
  See application file for complete search history.

(56) References Cited

U.S. PATENT DOCUMENTS

| | | | | |
|---|---|---|---|---|
| 6,460,043 | B1* | 10/2002 | Tabbara | G06F 16/2423 |
| 7,350,191 | B1* | 3/2008 | Kompella | G06F 9/44505 |
| | | | | 707/999.005 |
| 7,685,109 | B1* | 3/2010 | Ransil | G06F 16/2255 |
| | | | | 707/999.003 |
| 7,921,416 | B2* | 4/2011 | Fontoura | G06F 16/2452 |
| | | | | 717/136 |
| 8,060,490 | B2* | 11/2011 | Widjaja | G06F 3/1246 |
| | | | | 707/708 |
| 8,140,556 | B2* | 3/2012 | Rao | G06F 16/242 |
| | | | | 707/759 |
| 8,386,540 | B1* | 2/2013 | McAlister | G06F 16/256 |
| | | | | 707/899 |
| 8,392,482 | B1* | 3/2013 | McAlister | G06F 16/1727 |
| | | | | 707/899 |
| 8,473,506 | B2* | 6/2013 | Sedlar | G06F 16/245 |
| | | | | 707/769 |
| 8,543,566 | B2* | 9/2013 | Weissman | G06F 16/2462 |
| | | | | 707/715 |
| 8,706,715 | B2* | 4/2014 | Eidson | G06F 16/2462 |
| | | | | 707/715 |
| 8,713,038 | B2* | 4/2014 | Cohen | G06F 16/25 |
| | | | | 707/792 |
| 8,965,921 | B2* | 2/2015 | Gajic | G06F 16/285 |
| | | | | 709/201 |
| 9,633,060 | B2* | 4/2017 | Caudy | G06F 8/30 |

(Continued)

*Primary Examiner* — Hanh B Thai
(74) *Attorney, Agent, or Firm* — IPRO, PLLC

(57) ABSTRACT

A data processing method, a data processing device, and a non-volatile computer-readable storage medium are provided. The data processing method includes: setting a default mapping file; when a database query request is received, parsing through a default mapping file to generate a first query instruction; and querying a corresponding datasheet according to the first query instruction.

12 Claims, 3 Drawing Sheets

(56) References Cited

U.S. PATENT DOCUMENTS

| | | | |
|---|---|---|---|
| 9,639,570 B2* | 5/2017 | Wright | G06F 40/117 |
| 10,095,688 B1* | 10/2018 | Schilling | H04L 51/06 |
| 10,162,610 B2* | 12/2018 | Apte | G06F 8/427 |
| 10,198,466 B2* | 2/2019 | Wright | H04L 61/5069 |
| 10,255,274 B1* | 4/2019 | Schilling | G06F 11/3438 |
| 10,387,475 B2* | 8/2019 | Bhave | H04L 9/40 |
| 10,452,649 B2* | 10/2019 | Kent, IV | H04L 67/566 |
| 10,664,375 B2* | 5/2020 | Ransil | G06F 11/1446 |
| 10,726,153 B2* | 7/2020 | Nerurkar | G06F 18/24323 |
| 10,878,335 B1* | 12/2020 | Waugh | G06F 40/30 |
| 10,942,926 B2* | 3/2021 | Valentin | G06F 16/2282 |
| 10,956,406 B2* | 3/2021 | Hallgren | G06F 16/2433 |
| 11,151,133 B2* | 10/2021 | Kent, IV | G06F 16/24575 |
| 11,354,315 B2* | 6/2022 | Ransil | G06F 16/2228 |
| 2003/0131021 A1* | 7/2003 | Wight | G06Q 30/02 |
| 2003/0210276 A1* | 11/2003 | Patitucci | G06F 16/252 715/810 |
| 2006/0294038 A1* | 12/2006 | Grossfeld | G06F 16/2365 |
| 2008/0077884 A1* | 3/2008 | Patitucci | G06F 16/252 707/E17.005 |
| 2012/0254175 A1* | 10/2012 | Horowitz | G06F 16/278 707/E17.046 |
| 2013/0151491 A1* | 6/2013 | Gislason | G06F 16/2282 707/696 |
| 2013/0290249 A1* | 10/2013 | Merriman | G06F 16/278 707/610 |
| 2014/0095470 A1* | 4/2014 | Chen | G06F 16/24544 707/716 |
| 2015/0227521 A1* | 8/2015 | Levari | G06F 16/278 707/694 |
| 2015/0370795 A1* | 12/2015 | Ransil | G06F 16/245 707/741 |
| 2016/0092542 A1* | 3/2016 | Shivarudraiah | G06F 16/278 707/600 |
| 2016/0092543 A1* | 3/2016 | Shivarudraiah | G06F 16/2282 707/600 |
| 2016/0092544 A1* | 3/2016 | Shivarudraiah | G06F 16/278 707/600 |
| 2016/0092546 A1* | 3/2016 | Shivarudraiah | G06Q 10/00 707/600 |
| 2016/0092547 A1* | 3/2016 | Shivarudraiah | G06F 16/283 707/600 |
| 2016/0092548 A1* | 3/2016 | Shivarudraiah | G06F 16/283 707/600 |
| 2019/0026489 A1* | 1/2019 | Nerurkar | G16H 10/60 |
| 2019/0196890 A1* | 6/2019 | Bucchi | G06F 16/951 |
| 2019/0306093 A1* | 10/2019 | Schilling | G06F 16/245 |
| 2020/0073989 A1* | 3/2020 | Valentin | G06F 16/248 |

* cited by examiner

DATA PROCESSING METHOD, DATA PROCESSING DEVICE AND NON-VOLATILE COMPUTER-READABLE STORAGE MEDIA

CROSS-REFERENCE TO RELATED APPLICATION

The present disclosure claims priority to Chinese Patent Application No. 202011332603.3 filed in China on Nov. 24, 2020, the disclosure of which is hereby incorporated by reference in its entirely.

TECHNICAL FIELD

The present disclosure relates to the technical field of data processing, in particular to a data processing method, a data processing device and a non-volatile computer-readable storage medium.

BACKGROUND

As technology advances, more and more data needs to be processed. The greater the amount of data in the database, the greater the number of queries in the database, but the processing capacity of the server is limited. The increase in the amount of data and access will extend the response time of the server, resulting in poor user experience. In the related art, a method of splitting a database or a datasheet is generally used to split data into a plurality of datasheets of a plurality of databases. However, the original codes need to be modified one by one when splitting the database and the datasheet, with a large amount of modification, and errors easily occur in the process of modifying the codes, affecting the accuracy and stability of data.

SUMMARY

In view of this, embodiments of the present disclosure provide a data processing method, a processing device, and a non-volatile computer-readable storage medium.

The present disclosure provides a data processing method, comprises:
  setting a default mapping file;
  when a database query request is received, parsing the database query request through the default mapping file to generate a first query instruction; and
  querying a corresponding datasheet according to the first query instruction.

Optionally, the default mapping file is set in an interceptor, and when the database query request is received, parsing the database query request through the default mapping file to generate the first query instruction, comprises:
  when the database query request is received, intercepting the database query request by the interceptor and parsing the database query request through the default mapping file to generate the first query instruction.

Optionally, the default mapping file comprises a correspondence between the datasheet and the database.

Optionally, when the database query request is received, parsing through the default mapping file to generate the first query instruction, comprises:
  when the database query request is received, acquiring a second query instruction corresponding to the data query request;
  the first query instruction generating according to the second query instruction and the correspondence between the datasheet and the database, the first query instruction comprises a database name and a datasheet name, and the second query instruction comprises the datasheet name.

Optionally, the first query instruction is a Structured Query Language.

Optionally, the data processing method, comprises:
  returning the datasheet to a business side so that the business side processes the datasheet.

The present disclosure provides a data processing device comprising one or more processors and memories storing a computer program, the computer program is executed by the processor to perform:
  setting the default mapping file;
  when the database query request is received, parsing the database through the default mapping file to generate the first query instruction; and
  querying the corresponding datasheet according to the first query instruction.

Optionally, the default mapping file is set in the interceptor, and when the database query request is received, the computer program is executed by the processor to perform:
  when the database query request is received, intercepting the database query request by the interceptor and parsing the database query request through the default mapping file to generate the first query instruction.

Optionally, the default mapping file comprises the correspondence between the datasheet and the database.

Optionally, when the database query request is received, the computer program is executed by the processor to perform:
  when the database query request is received, acquiring the second query instruction corresponding to the data query request;
  the first query instruction generating according to the second query instruction and the correspondence between the datasheet and the database, wherein the first query instruction comprises the database name and the datasheet name, and the second query instruction comprises the datasheet name.

Optionally, the first query instruction is the Structured Query Language.

Optionally, the computer program is executed by the processor to perform:
  returning the datasheet to the business side so that the business side processes the datasheet.

The present disclosure provides a non-volatile computer readable storage medium storing the computer program, the program executed by one or more processors to perform:
  setting the default mapping file;
  when the database query request is received, parsing through the default mapping file to generate the first query instruction; and
  querying the corresponding datasheet according to the first query instruction.

Optionally, the default mapping file is set in the interceptor, and when the database query request is received, the computer program is executed by one or more processors to perform:
  when the database query request is received, intercepting the database query request by the interceptor and parsing the database query request through the default mapping file to generate the first query instruction.

Optionally, the default mapping file comprises the correspondence between the datasheet and the database.

Optionally, when the database query request is received, the computer program is executed by one or more processors to perform:

when the database query request is received, acquiring the second query instruction corresponding to the data query request;

the first query instruction generating according to the second query instruction and the correspondence between the datasheet and the database, wherein the first query instruction comprises the database name and the datasheet name, and the second query instruction comprises the datasheet name.

Optionally, the first query instruction is the Structured Query Language.

Optionally, the computer program is executed by one or more processors to perform:

returning the datasheet to the business side so that the business side processes the datasheet.

BRIEF DESCRIPTION OF THE DRAWINGS

The foregoing and/or additional aspects and advantages of the disclosure will become apparent and more readily appreciated from the following description of the embodiments, taken in conjunction with the accompanying drawings of which.

DETAILED DESCRIPTION

Figure 1:
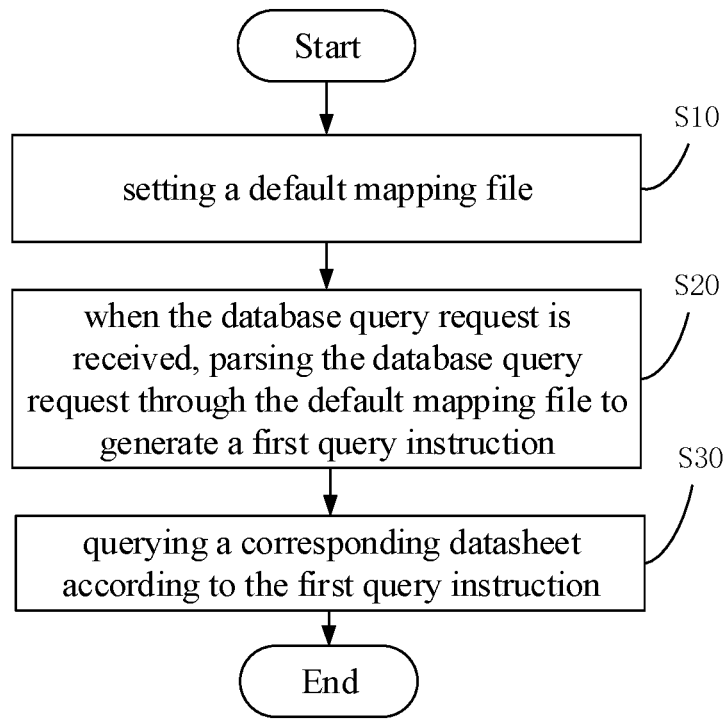
FIG. 1 is a flow diagram of a data processing method according to some embodiments of the present disclosure.

Reference will now be made in detail to the embodiments of the present disclosure, examples of which are illustrated in the drawings, wherein the same or similar reference numerals refer to the same or similar elements or elements having the same or similar function throughout. The embodiments described below with reference to the figures are exemplary and are intended to illustrate the present disclosure and are not to be regarded as a limitation on the present disclosure.

With reference to FIG. 1, the present disclosure provides a data processing method, comprising the following steps:

S10: setting a default mapping file;

S20: when a database query request is received, parsing the database query request through the default mapping file to generate a first query instruction;

S30: querying a corresponding datasheet according to the first query instruction.

Figure 2:
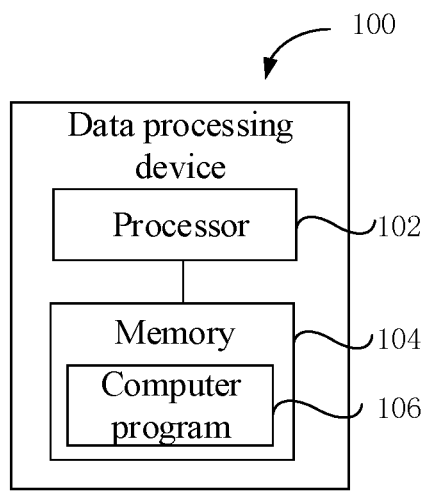
FIG. 2 is a structural diagram of a data processing device according to some embodiments of the present disclosure.

Referring to FIG. 2, embodiments of the present disclosure provide a data processing device 100. The data processing device 100 comprises a processor 102 and a memory 104, wherein the memory 104 stores a computer program 106, and when the computer program 106 is executed by the processor 102, it is achieved that the default mapping file is set; when a database query request is received, parsing the database query request through the default mapping file to generate the first query instruction; and a corresponding datasheet is queried according to the first query instruction. Wherein the processor 102 will be a processor separately provided by the data processing device 100 for implementing a data processing method, or will be a processor of the data processing device 100 itself, which is not particularly limited.

Figure 3:
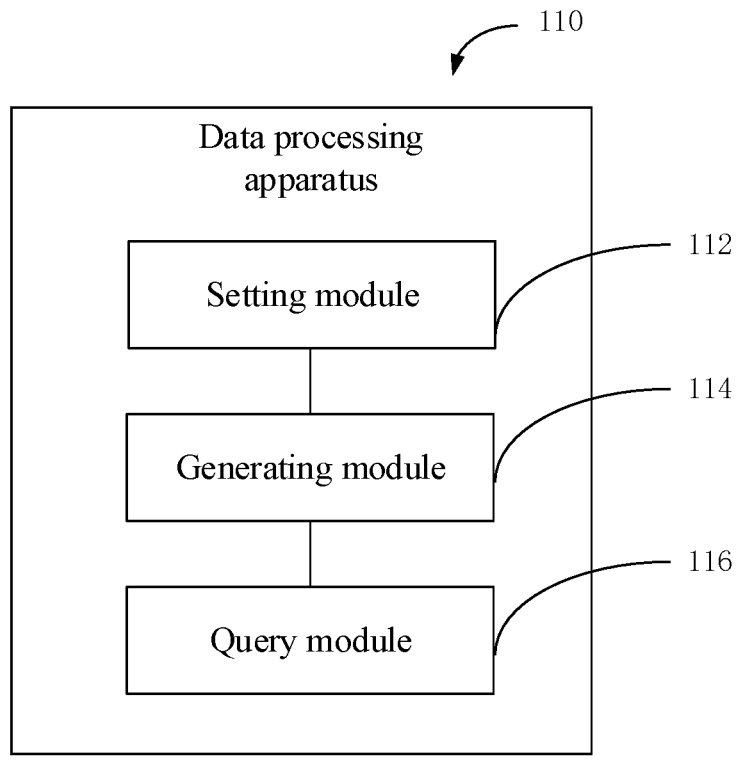
FIG. 3 is a block schematic diagram of a data processing device according to some embodiments of the present disclosure.

Referring to FIG. 3, embodiments of the present disclosure also provide a data processing device 110 by which the data processing methods of embodiments of the present disclosure will be achieved. The data processing device 110 includes a setting module 112, a generating module 114, and a query module 116. S10 will be achieved by the setting module 112, S20 will be achieved by the generating module 114, and S30 will be achieved by the query module 116. In other words, the setting module 112 is used for setting the default mapping file, the generating module 114 is used for parsing the database query request through the default mapping file to generate the first query instruction when the database query request is received, and the query module 116 is used for querying a corresponding datasheet according to the first query instruction.

Specifically, in the related art, when the amount of project data is large, a method of splitting a database or splitting a datasheet is generally used to split the data into a plurality of datasheets of a plurality of databases for storage, so as to reduce the burden on the database and shorten the query time. However, after the database is split, the access addresses of a plurality of datasheets in the original database need to be correspondingly modified to the access addresses of the split datasheets manually, and other relevant code lines also need to be correspondingly modified, resulting in a large amount of code modification, and error codes will occur with slight careless modification, affecting data processing efficiency and poor user experience.

In the data processing method, the data processing device 110 and the data processing device 100 of the embodiments of the present disclosure, parsing the database query request by setting the default mapping file to generate the first query instruction, querying the corresponding datasheet according to the first query instruction so that the address of the split datasheet can be queried without modifying the original code, and the data processing efficiency can be improved, the accuracy and stability of data can be ensured, and the user experience can be optimized.

The database query request will be actively triggered by user or automatically triggered by a data processing device.

In some embodiments, the database query request is actively triggered by user. The database query request is triggered by user clicking on the database query key at a data processing device.

In other embodiments, the database query request is automatically triggered by the data processing device. The triggering condition of the database query request can be preset in the data processing device; for example, a database query is automatically performed every morning to acquire data information generated by a business of the day.

In this way, receiving data query requests that are triggered in a plurality of ways can meet the needs of different systems and optimize the user experience.

Figure 4:
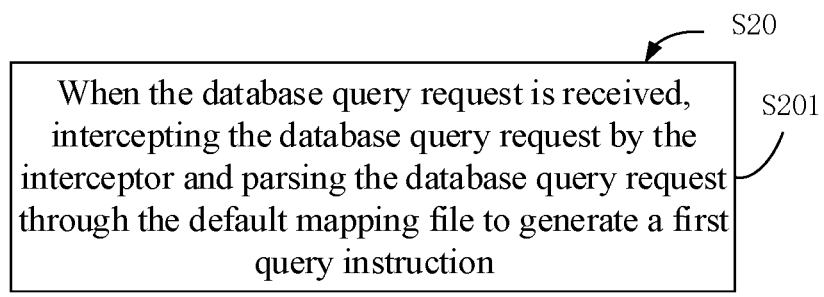
FIG. 4 is a flow diagram of a data processing method according to some embodiments of the present disclosure.

With reference to FIG. 4, optionally, the default mapping file is set in the interceptor, and S20 comprises:

S201: when the database query request is received, intercepting the database query request by the interceptor and parsing the database query request through the default mapping file to generate the first query instruction.

Optionally, S201 will be achieved by the generating module 114. In other words, the generating module 114 is used for intercepting the database query request by the interceptor when the database query request is received, and parsing the database query request through the default mapping file to generate the first query instruction.

Optionally, the processor 102 is used for intercepting the database query request by the interceptor when the database query request is received and parsing the database query request through the default mapping file to generate the first query instruction.

Specifically, the interceptor is added to the original project, and the default mapping file is set in the interceptor. When the database query request is received, the interceptor intercepts the database query request, and parses the database query request through the default mapping file to generate the first query instruction, and queries the corresponding datasheet according to the first query instruction. It can be understood that the interceptor can be a data access layer framework with long-term storage capability such as a mybatis interceptor, and the specific type can be selected according to project requirements, which is not limited herein.

Thus, intercepting the database query request can reduce the modification of the original code in the project, reduce the code error rate and improve the data processing efficiency.

Optionally, the default mapping file includes a correspondence between the datasheet and the database.

Specifically, setting the correspondence between the datasheet and the database in the default mapping file in order to parse the database query request through the default mapping file to generate the first query instruction when the database query request is received and to query the corresponding datasheet according to the correspondence between the datasheet and the database set in the default mapping file and the first query instruction.

In this way, the data processing efficiency can be improved, the accuracy and stability of data can be ensured, and the user experience can be optimized.

Figure 5:
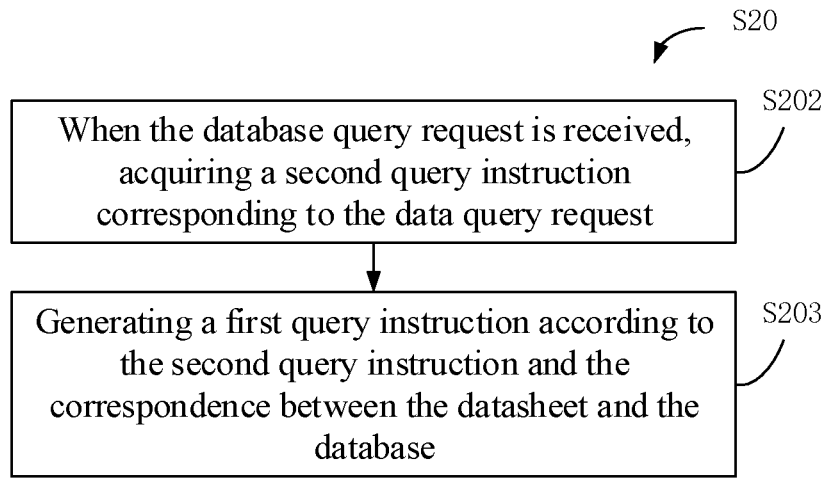
FIG. 5 is a flow diagram of a data processing method according to some embodiments of the present disclosure.

Referring to FIG. 5, optionally, the first query instruction comprises a datasheet name, and S20 comprises:

S202: when the database query request is received, acquiring a second query instruction corresponding to the data query request;

S203: generating the first query instruction according to the second query instruction and the correspondence between the datasheet and the database.

Optionally, S202 and S203 will be achieved by the generating module 114. In other words, the generating module 114 is used for acquiring the second query instruction corresponding to the data query request when the database query request is received, and for generating the first query instruction according to the second query instruction and the correspondence between the datasheet and the database.

Optionally, the processor 102 is used for acquiring the second query instruction corresponding to the data query request when the database query request is received, and generating the first query instruction according to the second query instruction and the correspondence between the datasheet and the database.

Specifically, setting the correspondence between the datasheet and the database in the default mapping file in order to acquire the second query instruction corresponding to the data query request when the database query request is received. Wherein the second query instruction comprises a datasheet name to be queried. According to the datasheet name in the second query instruction and the correspondence between the datasheet and the database, the datasheet name in the second query instruction is rewritten into the name of the split database and the datasheet in the first query instruction so as to generate the first query instruction and query the datasheet according to the database name and the datasheet name in the first query instruction.

In this way, the application layer of the program does not need to be rewritten, and the first query instruction is rewritten through the correspondence between the datasheet and the database in the default mapping file, so that the data processing efficiency can be improved, the code error rate can be reduced, and the accuracy and stability of the data can be ensured.

It will be understood that in other embodiments, the instruction to which the query request corresponds may also be an insert instruction, a delete instruction, an update instruction, etc.

Optionally, the first query instruction is a Structured Query Language.

Particularly, Structured Query Language (SQL) has the functions of data definition, data manipulation and data control, comprising data query language, data manipulation language, transaction control language, data control language, data definition language and pointer control language, which can be used to access data and query, update and manage the relational database system.

The first query instruction uses SQL language to enhance the convenience of interaction between different systems and improve the efficiency of data research and development.

In addition, the second query instruction can also use SQL language to enhance the convenience of interaction between different systems and improve the efficiency of data research and development.

Figure 6:
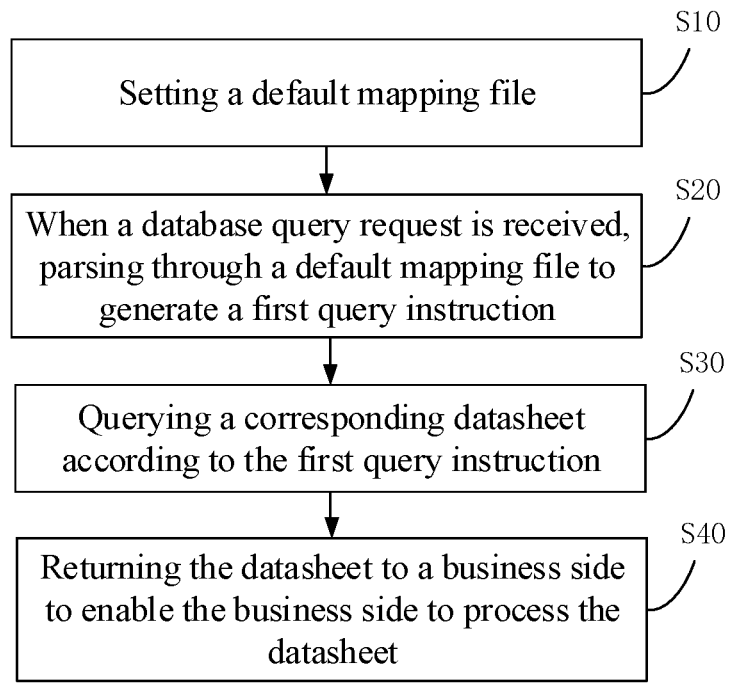
FIG. 6 is a flow diagram of a data processing method according to some embodiments of the present disclosure.

Referring to FIG. 6, optionally, the data processing method comprises:

S40: returning the datasheet to a business side so that the business side processes the datasheet.

Optionally, S40 will be achieved by the query module 116. In other words, the query module 116 is used to return the datasheet to the business side so that the business side processes the datasheet.

Optionally, the processor 102 is used for returning the datasheet to the business side so that the business side processes the datasheet.

Specifically, when the database query request is received, parsing through the default mapping file to generate the first query instruction, and querying the corresponding datasheet according to the first query instruction. After querying the datasheet, the datasheet is returned to the business side, so that the business side processes the datasheet.

In this way, the process of data querying can be made more complete and clear.

It will be understood that the business side will be a fixed terminal or a mobile terminal; for example, the business side will be a smart phone, a smart watch, etc. of the user end, or a processor, a computer, etc. of the business side, which is not particularly limited herein.

Embodiments of the present disclosure also provide a non-volatile computer readable storage medium 400 having storing a computer program 41 that, when executed by one or more processors 42, achieves the data processing method of any of the embodiments described above.

It will be understood by those of ordinary skill in the art that achieving all or part of the flow of the methods of the embodiments described above can be accomplished by instructing the associated hardware by a computer program, which can be stored on a non-volatile computer readable storage medium, and when the computer program is executed, it comprises the flow of the embodiments of the methods described above. Wherein the storage medium will be a magnetic disk, an optical disk, a Read-Only Memory (ROM), etc.

The above embodiments are merely representative of several embodiments of the disclosure, which are described specifically and in detail, but are not to be regarded as a limitation on the scope of the present disclosure. It should be noted that several variations and modifications can be made by those of ordinary skill in the art without departing from the conception of the present disclosure, which is within the scope of the present disclosure. Therefore, the scope of protection of this public patent shall be subject to the attached claim.

What is claimed is:

1. A data processing method, performed by a data processing device comprising a processor and a memory, the method comprises:
    setting, by the processor, a default mapping file;
    when a database query request is received, parsing, by the processor, through the default mapping file to generate a first query instruction; and
    querying, by the processor, a corresponding datasheet according to the first query instruction;
    wherein the default mapping file comprises a correspondence between a datasheet and a database;
    wherein when the database query request is received, the parsing, by the processor, through the default mapping file to generate the first query instruction comprises:
    when the database query request is received, acquiring, by the processor, a second query instruction corresponding to the data query request; wherein
    the second query instruction comprises a datasheet name to be queried, according to the datasheet name in the second query instruction and the correspondence between the datasheet and the database, the datasheet name in the second query instruction is rewritten into the name of the split database and the datasheet in the first query instruction so as to generate the first query instruction;
    wherein the method further comprises:
    querying, by the processor, the datasheet according to the database name and the datasheet name in the first query instruction.

2. The data processing method according to claim 1, wherein the default mapping file is set in an interceptor, and when the database query request is received, the parsing, by the processor, the database query request through the default mapping file to generate the first query instruction comprises:
    when the database query request is received, intercepting, by the processor, the database query request by the interceptor and parsing, by the processor, the database query request through the default mapping file to generate the first query instruction.

3. The data processing method according to claim 1, wherein the first query instruction is a Structured Query Language.

4. The data processing method according to claim 1, comprises:
    returning, by the processor, the datasheet to a business side to enable the business side to process the datasheet.

5. A data processing device, comprising one or more processors and memories, the memories storing a computer program, and the computer program is executed by the processor to perform:
    setting the default mapping file;
    when the database query request is received, parsing through the default mapping file to generate the first query instruction; and
    querying the corresponding datasheet according to the first query instructions;
    wherein the default mapping file comprises a correspondence between a datasheet and a database;
    wherein when the database query request is received, the parsing through the default mapping file to generate the first query instruction comprises:
    when the database query request is received, acquiring a second query instruction corresponding to the data query request; wherein
    the second query instruction comprises a datasheet name to be queried, according to the datasheet name in the second query instruction and the correspondence between the datasheet and the database, the datasheet name in the second query instruction is rewritten into the name of the split database and the datasheet in the first query instruction so as to generate the first query instruction;
    the computer program is executed by the processor to perform:
    querying the datasheet according to the database name and the datasheet name in the first query instruction.

6. The data processing device according to claim 5, wherein the default mapping file is set in the interceptor, and when the database query request is received, that the computer program is executed by the processor to perform:
    when the database query request is received, intercepting the database query request by the interceptor and parsing the database query request through the default mapping file to generate the first query instruction.

7. The data processing device according to claim 5, wherein the first query instruction is a Structured Query Language.

8. The data processing device according to claim 5, wherein the computer program is executed by the processor to perform:
    returning the datasheet to the business side to enable the business side to process the datasheet.

9. A non-volatile computer-readable storage medium storing a computer program, wherein the computer program is executed by one or more processors to perform:
    setting the default mapping file;
    when the database query request is received, parsing through the default mapping file to generate the first query instruction; and
    querying the corresponding datasheet according to the first query instructions;
    wherein the default mapping file comprises a correspondence between a datasheet and a database;
    wherein when the database query request is received, the parsing through the default mapping file to generate the first query instruction comprises:
    when the database query request is received, acquiring a second query instruction corresponding to the data query request; wherein
    the second query instruction comprises a datasheet name to be queried, according to the datasheet name in the second query instruction and the correspondence between the datasheet and the database, the datasheet name in the second query instruction is rewritten into the name of the split database and the datasheet in the first query instruction so as to generate the first query instruction;

wherein the computer program is executed by one or more processors to perform:
querying the datasheet according to the database name and the datasheet name in the first query instruction.

10. The non-volatile computer-readable storage medium according to claim 9, wherein the default mapping file is set in the interceptor, and when the database query request is received, the computer program is executed by the one or more processors to perform:
when the database query request is received, intercepting the database query request by the interceptor and parsing the database query request through the default mapping file to generate the first query instruction.

11. The non-volatile computer-readable storage medium according to claim 9, wherein the first query instruction is a Structured Query Language.

12. The non-volatile computer-readable storage medium according to claim 9, wherein the computer program is executed by the one or more processors to perform:
returning the datasheet to the business side to enable the business side processes the datasheet.

\* \* \* \* \*